United States Patent
Derstine et al.

(10) Patent No.: US 6,339,503 B1
(45) Date of Patent: Jan. 15, 2002

(54) OPTICAL INTERCONNECT USING MICROLENS/MINILENS RELAY

(75) Inventors: Matthew W. Derstine, Sunnyvale; Suzanne Wakelin; James S. Wong, both of Mountain View, all of CA (US)

(73) Assignee: Oni Systems Corp., San Jose, CA (US)

( * ) Notice: Subject to any disclaimer, the term of this patent is extended or adjusted under 35 U.S.C. 154(b) by 0 days.

(21) Appl. No.: 09/432,892

(22) Filed: Nov. 2, 1999

Related U.S. Application Data

(60) Provisional application No. 60/107,292, filed on Nov. 6, 1998, and provisional application No. 60/107,393, filed on Nov. 6, 1998.

(51) Int. Cl.$^7$ .......................... G02B 27/10; G02B 13/22
(52) U.S. Cl. ...................... 359/622; 359/619; 359/621; 359/663
(58) Field of Search ..................... 359/619, 621, 359/622, 623, 626, 663, 624

(56) References Cited

U.S. PATENT DOCUMENTS

| | | | |
|---|---|---|---|
| 5,439,621 A | | 8/1995 | Hoopman ................ 264/2.5 |
| 5,594,752 A | * | 1/1997 | Endriz ..................... 372/50 |
| 5,787,107 A | * | 7/1998 | Leger et al. ............. 372/71 |
| 5,793,520 A | * | 8/1998 | Stace et al. ............. 359/320 |
| 6,072,627 A | * | 6/2000 | Nomura ................... 359/463 |
| 6,239,912 B1 | * | 5/2001 | Ozawa .................... 359/618 |
| 6,252,717 B1 | * | 6/2001 | Grosskopf .............. 359/619 |

FOREIGN PATENT DOCUMENTS

| | | | |
|---|---|---|---|
| WO | WO 97/34171 | 9/1997 | ........... G02B/21/06 |

* cited by examiner

*Primary Examiner*—Georgia Epps
*Assistant Examiner*—Gary O'Neill
(74) *Attorney, Agent, or Firm*—Townsend and Townsend and Crew LLP

(57) ABSTRACT

An optical system for imaging an array of light sources includes an array of microlenses disposed to intercept light from respective light sources in the array of light sources to reduce the divergence angles of light emanating from the light sources, a first array of lenses (sometimes referred to as minilenses), a second array of lenses (minilenses), and an additional array of microlenses disposed to intercept and focus light from the second array of lenses. Each lens in the first array is sized to intercept light from a respective sub-plurality of the microlenses, and each lens in the second array intercepts and focuses light from a respective lens in the first array. The first and second arrays of minilenses are preferably configured to define a doubly-telecentric imaging system. Each microlens in the additional array intercepts and focuses light that originated from a respective light source in the array of light sources and passed through a respective microlens in the first-mentioned array of microlenses.

40 Claims, 5 Drawing Sheets

OPTICAL INTERCONNECT USING MICROLENS/MINILENS RELAY

CROSS-REFERENCES TO RELATED APPLICATIONS

This application claims priority from U.S. patent application Ser. No. 60/107,292, filed Nov. 6, 1998, titled "Optical Interconnect Using Microlens/Minilens Relay," the entire disclosure of which (including all attached documents) is incorporated by reference in its entirety for all purposes.

This application also incorporates the entire disclosure (including all attached documents) of U.S. patent application Ser. No. 60/107,393, filed Nov. 6, 1998, titled "Microlens Array with Spatially Varying Optical Property" by reference in its entirety for all purposes.

STATEMENT AS TO RIGHTS TO INVENTIONS MADE UNDER FEDERALLY SPONSORED RESEARCH AND DEVELOPMENT

The U.S. Government has rights to this invention pursuant to Contract No. DAAH01-97-C-R109, awarded by the U.S. Air Force.

This application is being filed concurrently with the following U.S. patent application, the entire disclosure of which is incorporated by reference in its entirety for all purposes:

Suzanne Wakelin, Matthew W. Derstine, and James S. Wong, titled "Microlens Array with Spatially Varying Optical Property" U.S. patent application Ser. No. 09/423,293.

BACKGROUND OF THE INVENTION

The present invention relates generally to optical communications, and more specifically to techniques for coupling light from an array, typically two-dimensional (2D), of optical sources on a chip or board to a corresponding array of optical detectors on another chip or board.

The need for high performance processors with large addressable memory will continue to increase. Continued evolution of digital CMOS technology processors can provide the basis for supporting these requirements; Giga-op (one billion operations per second) single chip processing devices will be available in the near future. However, the electrical interconnect fabric is not scaleable with digital signal processing technology. Conventional, electrical interconnect capacity can only be increased through the use of more wires requiring large devices and boards, and/or higher speed data transfer clocks requiring excessive power.

One approach to overcoming the limitations of conventional electrical interconnections is the uses of optical interconnections (i.e., arrays of photonic transmitters and receivers communicating over an optical backplane). Each electrical signal that is to be sent from a first chip or board to a second chip or board is communicated to an electrical-to-optical conversion (E/O) device (i.e., is used to drive an optical source) on the first chip or board. The light from the optical source is then communicated to an optical-to-electrical conversion (O/E) device (i.e., optical detector) on the second chip or board, which detector provides an electrical signal, which is communicated to appropriate electronic circuitry on the second chip or board.

There are a number of methods and approaches described for connecting 2D arrays of optical elements from one chip or board to another. The basic disadvantage of most of the systems are that they are relatively sensitive to alignment and or environmental changes. In particular, the prior systems used heavy metal baseplates, highly adjustable optical systems, or were designed to be used with precisely aligned monolithic optical systems.

SUMMARY OF THE INVENTION

The present invention provides apparatus and methods for efficiently coupling light between arrays of optical sources and detectors. The sources and detectors can be active devices or can be arrays of terminated fiber optic elements. The invention provides optical components that are rugged, low cost, and easily assembled.

An optical system for imaging an array of light sources according to an embodiment of the invention includes an array of microlenses disposed to intercept light from respective light sources in the array of light sources to reduce the divergence angles of light emanating from the light sources, a first array of lenses (sometimes referred to as minilenses), and a second array of lenses (minilenses). Each lens in the first array is sized to intercept light from a respective sub-plurality of the microlenses, and each lens in the second array intercepts and focuses light from a respective lens in the first array. The first and second arrays of minilenses are preferably configured to define a doubly-telecentric imaging system. The doubly-telecentric imaging system may have unit magnification or a magnification other than unity.

A further embodiment of the invention includes an additional array of microlenses disposed to intercept and focus light from the second array of lenses. Each microlens in the additional array intercepts and focuses light that originated from a respective light source in the array of light sources and passed through a respective microlens in the first-mentioned array of microlenses.

The optical system may be used with an array of detectors, each one optically conjugate with a respective light source in the array of light sources. If the detectors are generally commensurate in size with the microlenses in the first mentioned-array of microlenses, the light emerging from the second array of lenses may be directed to the detectors without intervening microlenses. In the event that the detectors are significantly smaller than the microlenses, it may be preferred to use the further embodiment of the optical system, which includes the additional array of microlenses.

In a particular geometric arrangement of the optical system, the array of sources and the array of microlenses are arranged as respective pluralities of separated clusters according to a predefined pattern, and the lenses in the first array are arranged according to the predefined pattern with each lens in the first array having a lateral extent greater than the lateral extent of a respective one of the clusters.

A method of imaging an array of light sources according to an embodiment of the invention includes reducing the divergence angle of light emanating from each of the light sources to provide a corresponding set of less-divergent beams, and for each of a plurality of subsets of beams, using respective first and second lenses to relay and focus that subset of beams. The method may further include increasing the convergence angle of each beam emanating from the second lenses. The method may include using a microlens array to reduce the divergence angle of light emanating from each of the light sources, or to increase the convergence angle of each beam emanating from the second lenses.

A further understanding of the nature and advantages of the present invention may be realized by reference to the remaining portions of the specification and the drawings.

DESCRIPTION OF SPECIFIC EMBODIMENTS

Introduction and General Optical Configuration

The present invention provides techniques for coupling light from one array of points to another. Typically, one array will be a plurality of light sources and the other a corresponding plurality of light detectors. The sources can be the ends of output fibers and the detectors the ends of input fibers. One application contemplates that the sources will be driven by a plurality of electrical signals on one board or module, and the detectors will provide a corresponding plurality of electrical signals on another board or module.

In one implementation, each of the optical sources in the array is a vertical cavity surface emitting laser (VCSEL), which may be a gallium arsenide (GaAs) structure, and the source and detector arrays are bonded to respective silicon CMOS substrates that contain the driver/receiver circuitry for the module. The sources could also be resonant cavity LEDs.

Figure 1:
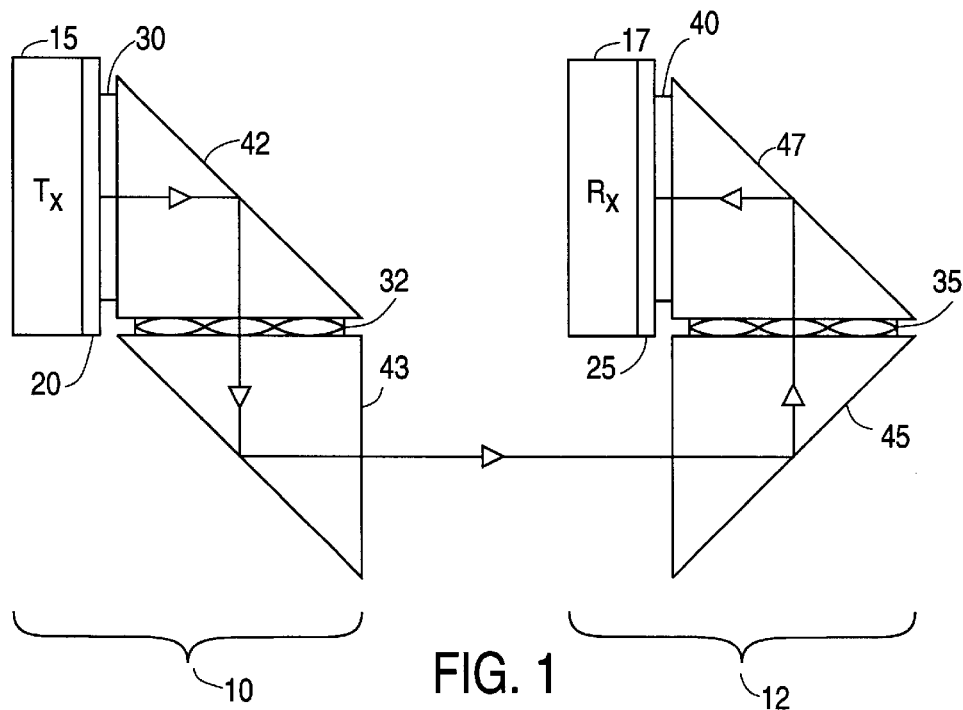
FIG. 1 is a simplified side view showing communication between a transmitter module and a receiver module using an optical interconnection according to an embodiment of the invention.

FIG. 1 is a simplified side view showing communication between first and second modules 10 and 12 using an optical interconnection according to an embodiment of the invention. The optical interconnection is partitioned between the two modules. Module 10 includes an electrical transmitter block 15 and the first half of the optical interconnection. Module 12 includes an electrical receiver block 17 and the second half of the optical interconnection. Transmitter block 15 provides a plurality of electrical signals, which are to be communicated to receiver block 17. The figure arbitrarily shows the communication from left to right. As a matter of terminology, it is convenient to define upstream and downstream directions. In the figure, module 10 can be considered to be upstream of module 12, whereupon the transmission sent to module 12 is considered a downstream transmission.

Blocks 15 and 17 are shown schematically, and could represent circuitry, or electrical connectors to other circuitry (not shown). Transmitter block 15 interfaces to the optical interconnection via an array 20 of electrical-to-optical conversion (E/O) devices, while receiver block 17 interfaces to the optical interconnection via an array 25 of optical-to-electrical conversion (O/E) devices. For convenience, arrays 20 and 25 will be referred to as the source and detector arrays. In fact, these arrays could be defined by the ends of optical fibers.

The optical elements in the first half of the interconnection include a first microlens array 30 and a first minilens array 32; those in the second half include a second minilens array 35, and an optional second microlens array 40. The embodiment shown in FIG. 1 uses a folded optical path, provided by prisms 42 and 43 on the first module, and 45 and 47 on the second module. This folded configuration has the property that the transmitter and receiver blocks can face in the same direction. A single line shows the general nature of the folded path, although the actual optical paths are more complicated, as will be described below.

Figure 2:
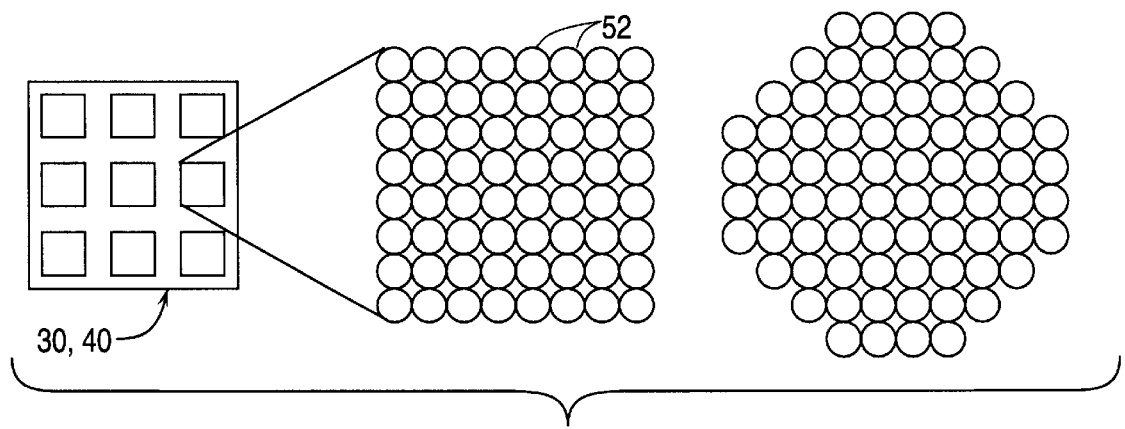
FIG. 2 is a plan view of one of the microlens arrays, including an enlarged detail portion of one of the microlens sub-arrays.

FIG. 2 is a plan view of one of the microlens arrays (30 or 40). In a preferred embodiment, the microlens array includes a plurality of spatially separated sub-arrays, referred to as clusters 50 (or patches). The figure also includes an enlarged view of one of the clusters, showing the individual microlens elements 52. The source and detector arrays are arranged in corresponding clusters so that the individual microlenses in array 30 are registered to respective devices in source array 20, and the individual microlenses in array 40 are registered to respective devices in detector array 25. For example, 576 sources could be arranged in 9 clusters, perhaps arranged in a 3×3 array as in the figure, with an 8×8 array of sources in each cluster. Other possibilities abound, depending on the needs of the system.

Figure 3:
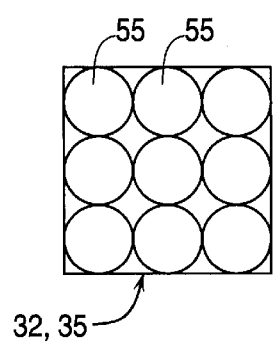
FIG. 3 is a plan view of one of the minilens arrays.

FIG. 3 is a plan view of one of the minilens arrays (32 or 35). As can be seen the minilens array includes individual minilenses 55, arranged so that each minilens registers with a respective microlens cluster. The geometry and relative dimensions and spacing are such that each minilens intercepts the light from all the microlenses in the corresponding cluster. The microlenses, microlens clusters, and minilenses are shown as square arrays disposed on a square pitch (grid). It is possible to increase the spatial density of sources and detectors by having a close-packed hexagonal configuration. Alternatively, the sources, detectors, and microlenses could still be on a square pitch, but the clusters could be bounded by an octagon rather than a square to allow more microlenses per cluster. This is shown in the rightmost portion of FIG. 2. An advantage of putting the elements in an octagonal array is to improve the interconnect density by using the minilens in a more radially uniform manner than with a square array.

Overall Optical Operation

Figure 4:
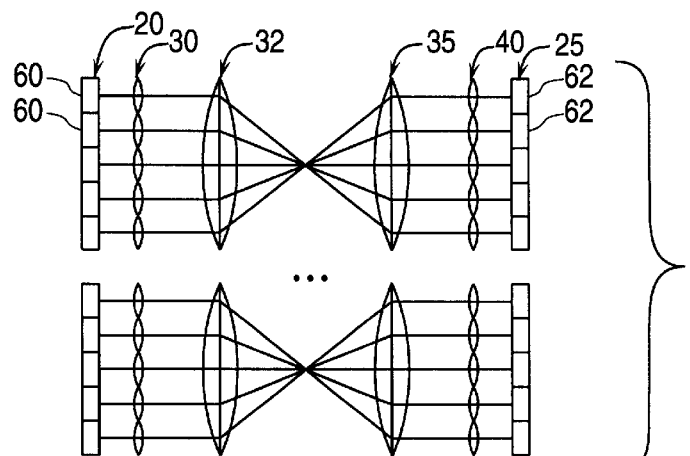
FIG. 4 is an optical schematic showing the transfer between a source array and a detector array.

FIG. 4 is an optical schematic showing the optical transfer between a portion of source array 20 and a portion of detector array 25. The figure shows only the axial ray from the center of each source, and the optical path is shown unfolded. The source array includes individual sources 60; the detector array includes individual detectors 62. Each cluster in microlens array 30, along with its respective minilens in minilens array 32, cooperates with the corresponding minilens in minilens array 35 and its associated cluster in microlens array 40 to provide the interconnection between a cluster of sources and a respective cluster of detectors. The optics are preferably doubly telecentric, which makes the system more tolerant to misalignment. The figure is not to scale; the doubly telecentric relay is four times the focal length of the minilens, less an amount from the focusing effect of the microlenses.

Figure 5:
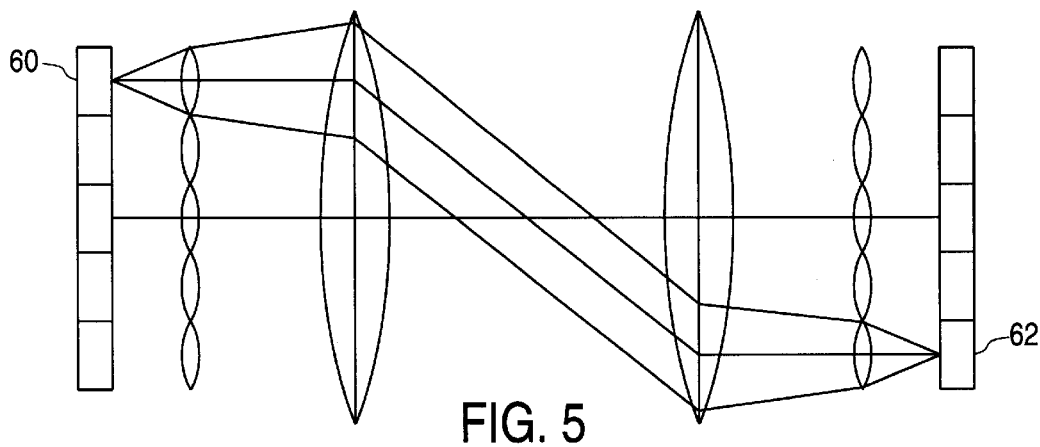
FIG. 5 is shows schematically the rays between a particular individual source in one cluster to the corresponding individual detector in the corresponding cluster.

FIG. 5 shows schematically the rays between a particular individual source 60 in one cluster to the corresponding individual detector 62 in the corresponding cluster. The source is generally very small (with the light coming from an aperture of perhaps a few $\mu$m), and is thus characterized by a significant divergence angle caused by diffraction. The microlens operates to reduce the divergence angle. Because the divergence angle of the light is reduced, a lens can be used to relay the light from all the sources in a single cluster using the imaging properties of the lens. The light from the source, after passing through the microlens and minilens in the transmitter module, is generally collimated, and is brought to a focus by the minilens and microlens in the receiver module.

The use of second microlens array 40 can be avoided in some embodiments. Since the capacitance of a detector increases with size, small detectors can operate at higher speeds with less power. If a larger detector is acceptable for a particular implementation, the microlens array can be eliminated. However for high-speed systems, smaller detectors are generally preferred, and therefore it is preferred to have the second microlens array to focus the light from the source to a smaller spot.

The approach of using minilens arrays instead of single large lenses to image clusters of sources onto respective clusters of detectors is advantageous since it allows the use of relatively simple lenses to perform the imaging. By making the lens small enough, a single optical surface has sufficiently small optical aberrations that can be used alone to do the imaging. At the same time, the minilens can be made sufficiently large that a significant number (say on the order of 400) of channels can be imaged by this lens. The minilenses can be characterized by a relatively small numerical aperture (large f/number).

As discussed above, the use of minilenses leads to partitioning the array of sources (and the array of detectors) into sub-arrays (clusters or patches). This has the side benefit of easing the fabrication of the sources and detectors, since each cluster of sources can be applied to the CMOS transmitter chip independently, making the need for very large arrays of perfect sources unnecessary.

Extension to Bidirectional Communication and Specific Geometric Implementation

Figure 6:
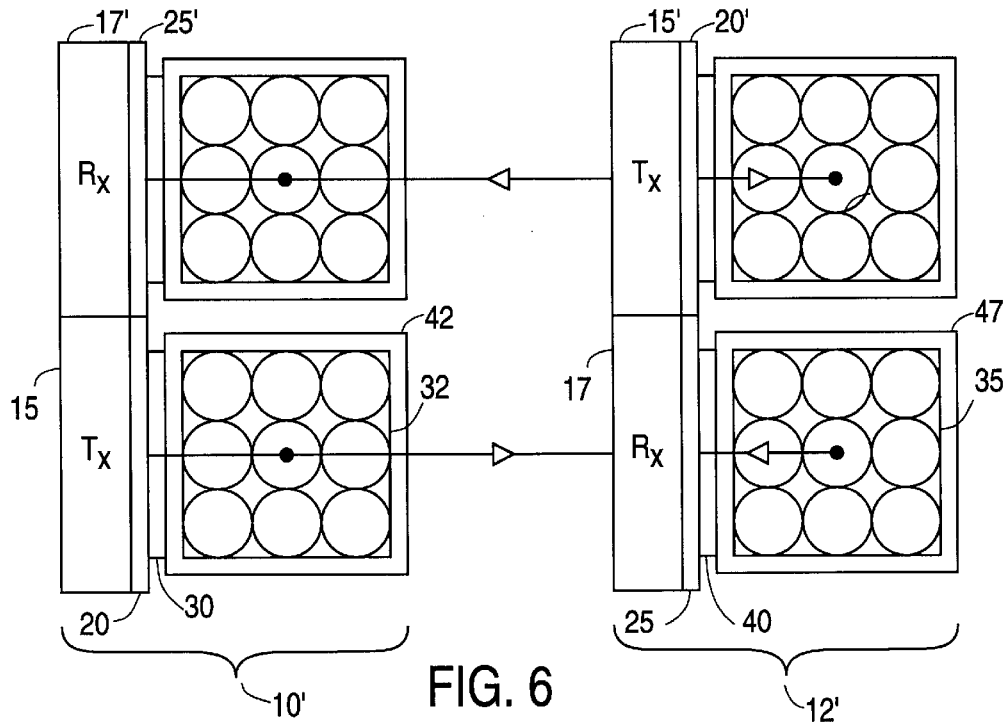
FIG. 6 is a simplified top view showing bidirectional communication between a pair of modules using an the optical interconnection along the lines of the embodiment of FIG. 1.

FIG. 6 is a simplified top view showing how the embodiment of FIG. 1 can be extended to support bidirectional communication between a pair of modules, designated 10' and 12'. The lower half of the figure corresponds to what is shown in FIG. 1, which supports downstream communications. The top half of the figure shows additional elements that are provided to support upstream communications. These additional elements include a receiver block 17' and associated O/E device array 25' provided to module 10', and a transmitter block 15' and associated E/O device array 20' provided to module 12'.

The additional optical interconnect arrays and prisms can be identical to the corresponding arrays and prisms shown in the lower half of the figure. While these additional optical components are shown as separate duplicated items, there is no need for separate components. Rather the microlens arrays, minilens arrays, and prisms that support the downstream communications can be extended as part of the same unitary components to provide support for the upstream communications.

Figure 7:
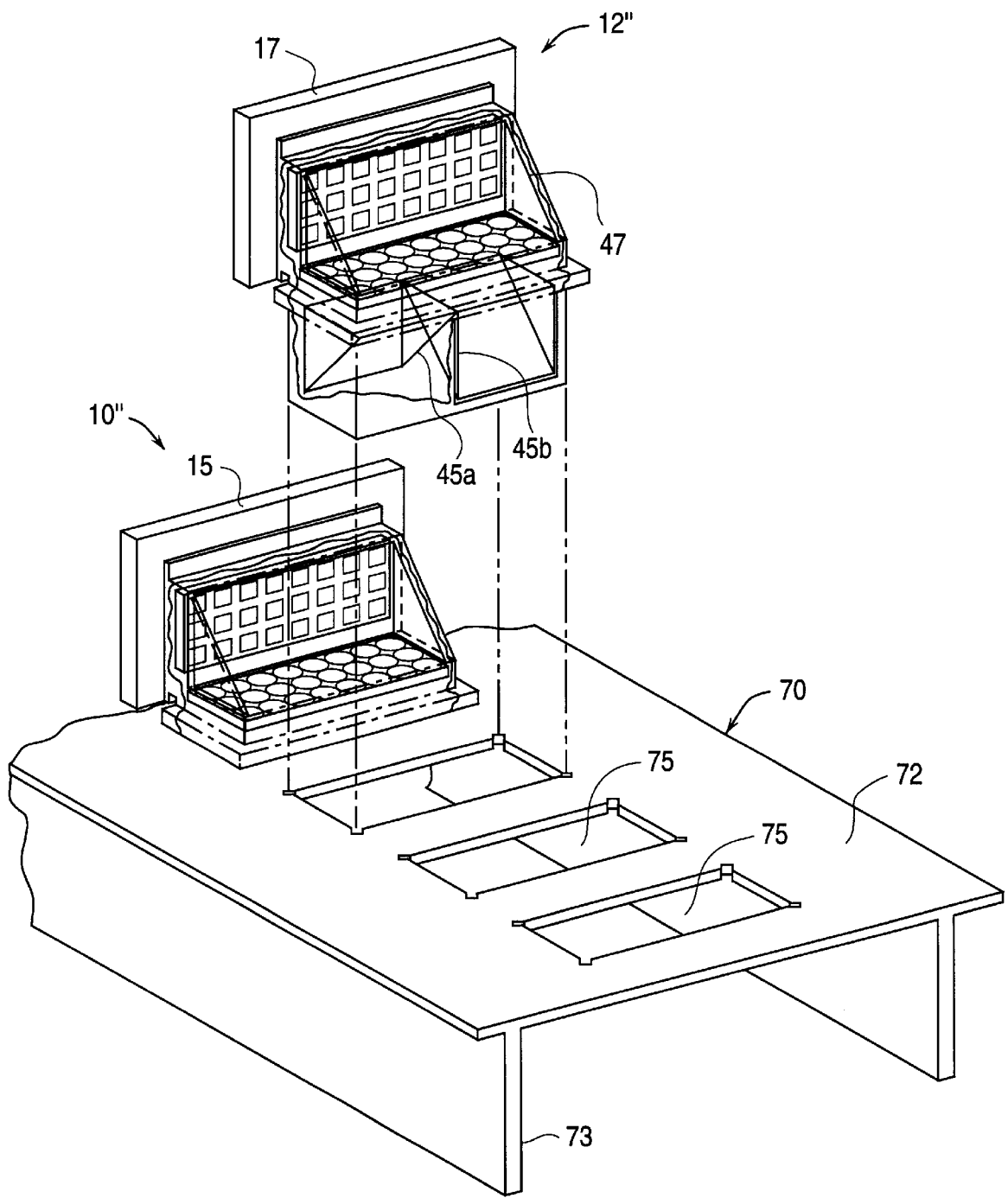
FIG. 7 is a exploded perspective view showing a number of features of a system based on the layout shown in FIG. 1.

FIG. 7 is an exploded perspective view showing a number of features of a system based on the layout shown in FIG. 1. The two modules are designated 10" and 12", and are shown disposed for engagement with a backplane structure 70, which has a baseplate 72. While the system includes elements in addition to those shown in FIG. 1, corresponding reference numerals will be used. Modules 10" and 12" are shown as being configured to be inserted into apertures 75 in backplane baseplate 72. Module 10" is shown inserted into the baseplate while module 12" is above the baseplate prior to insertion.

Module 12" is shown as having two prisms, designated 45a and 45b, which face in opposite directions. Module 10" is correspondingly configured, but the prisms are hidden. The modules are drawn with the case partly cut away, and are shown as having 24 clusters and minilenses each. Thus the left-side 12 clusters of detectors in module 12" can receive signals from module 10" via prism 45a and prism 47, while the right-side 12 clusters of detectors can receive signals from a downstream module (not shown) via prism 45b and prism 47. This is possible because the clustering of the sources and detectors enables mechanical separation between the optical systems in the forward and backward direction.

It is also noted that the figure can be used to illustrate the possibility that the left-side 12 clusters in module 12" could be detectors, as shown in FIG. 1, while the right-side 12 clusters could be sources used to send light to the downstream module (not shown). Further, if half of the left-side clusters in module 10" were sources and the other half detectors, and half of the left-side clusters in module 12" were detectors and the other half sources, prism 45a could be used to support bidirectional communication between modules 10" and 12" along the lines illustrated in FIG. 6.

The ability to construct a system that can be plugged together is facilitated by the microlens/minilens imaging system, which reduces the positional tolerance requirements on the plug-in element. For example, the sources may be arranged in clusters of 8×8 with a separation between elements of 125 $\mu$m. If the source and receiver elements are small (say <10 $\mu$m), than the positioning tolerance of the source and detector could be quite small (perhaps <2 $\mu$m). However, by expanding the beam and mechanically separating the optics into two rigid sections, these sections can be misaligned by as much as 100 $\mu$m or more, large enough that this can be achieved by normal machining methods. The disadvantage of this approach is that reduces the angular tolerances. However, it is still possible to achieve the necessary angular tolerances using normal machining practices.

FIG. 7 also shows that the optical systems can be constructed so that the sources and detectors on different modules are oriented in the same plane. For example, if the sources are 2D arrays of vertical emitting lasers and the receivers are 2D arrays of detectors that are integrated onto a common electronic drive circuit, and this is mounted onto a circuit card, the circuit cards could then be plugged into the mechanical backplane in a fashion similar to electrical backplanes. This feature, combined with the reduced tolerances of the optical system, permits the creation of a blind-mate optical interconnect system.

Alternative Configurations

Figure 8:
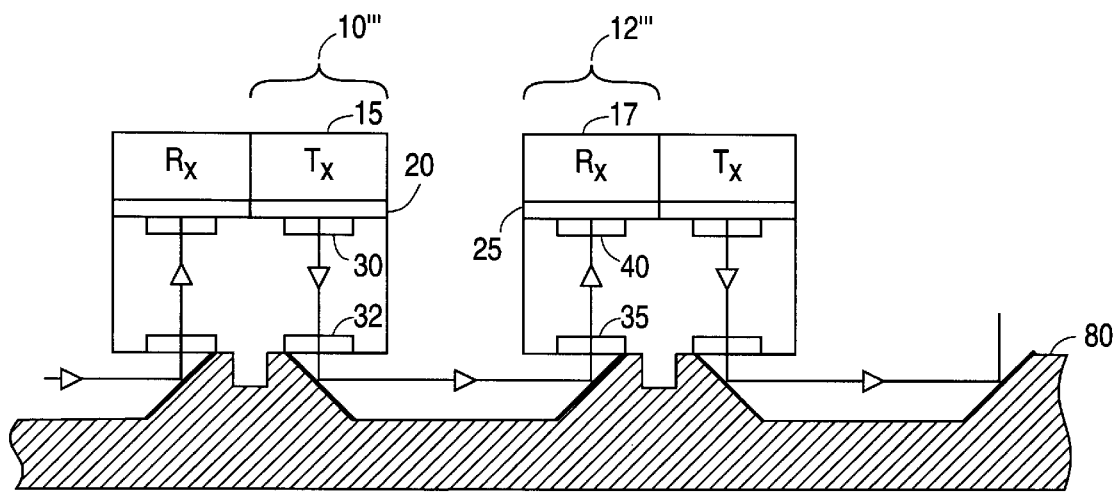
FIG. 8 is a simplified side view showing communication between a transmitter module and a receiver module using an optical interconnection according to an alternative embodiment of the invention.

FIG. 8 is a simplified side view showing communication between a first module having a transmitter portion 10''' and a second module having a receiver portion 12''', using an optical interconnection according to an alternative embodiment of the invention. Elements corresponding to those in FIG. 1 use corresponding reference numerals. This arrangement differs from that of FIG. 1 in that the source, detector, microlens, and minilens arrays are all disposed parallel to a backplane structure 80. The figure also shows the first module as having a receiver portion for receiving downstream communications from an upstream module (not shown), and the second module as having a transmitter portion for transmitting downstream communications to a downstream module (not shown).

Backplane structure 80 has a profile in the form of a truncated sawtooth with flat peaks and valleys separated by inclined ramps. The surface of each peak is formed with a recessed keyway that mates with a corresponding protruding key on the bottom of the module to register the module. The inclined ramps are inclined at 45° angles to relay the light from one module to the other. The inclined reflective surfaces can be implemented by machining and polishing the surfaces of the backplane structure, which may be aluminum. Alternatively, the reflective surfaces can be implemented by using the backplane structure to support commercially available mirrors. The embodiment of FIG. 8 can be extended to support upstream communications in the same way discussed above in connection with the embodiment of FIG. 6, which extends the embodiment of FIG. 1.

Figure 9:
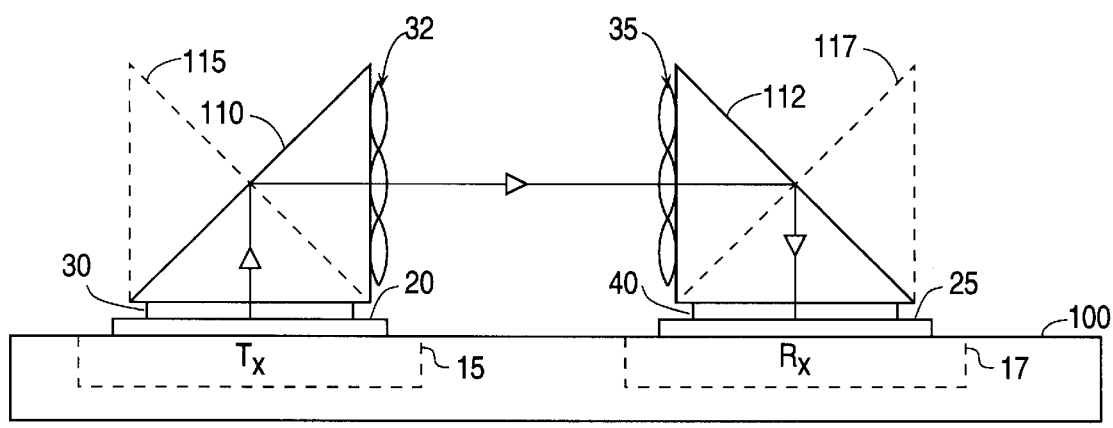
FIG. 9 is a simplified side view showing communication between a transmitter module and a receiver module using an optical interconnection according to an embodiment having an active backplane.

FIG. 9 is a simplified side view showing an embodiment of the invention having an active backplane 100. Again, elements corresponding to those in FIG. 1 use corresponding reference numerals. This arrangement differs in that transmitter and receiver blocks 15 and 17 are integrated into backplane 100. Source and detector arrays 20 and 25 can be connected to the transmitter and receiver blocks in the same way as in the embodiment of FIG. 1. The optical relay elements of this embodiment include microlens array 30, first and second minilens arrays 32 and 35, and optional microlens array 40. The path is folded by two prisms 110 and 112 rather than four prisms as in the embodiment of FIG. 1.

Two additional prisms 115 and 117 are shown in phantom, and would be deployed in order to support communication with upstream and downstream blocks. This embodiment can also be extended to provide bidirectional communication by juxtaposing source and detector arrays as described above.

Specific Physical Implementations

As mentioned above, the source and detector device arrays may be bonded to a silicon CMOS substrate that contains the drive circuitry for the transmitter and receiver arrays. In some implementations, the minilenses will typically have respective diameters on the order of 5 mm diameter and respective focal lengths on the order of 20 mm. In some implementations, the microlenses will typically have center-to-center spacings on the order of 125 $\mu$m and focal lengths on the order of 260 $\mu$m. Further, as will be described below, it is often preferred that the focal length of the microlenses vary radially across the array's clear aperture to correct for field curvature of the minilenses.

In developing optimum optical configurations, it is possible to simulate the source and detector arrays with a custom reflective and transmissive mask to simulate the device windows as would be obtained with the real devices. These would then be used with optical fibers to input and output the optical signals so that the performance of the modules could be evaluated.

For testing and evaluation purposes it is sometimes useful to fabricate prototype versions of the optical components on thin (~1–2 mm) substrates, even-if the ultimate embodiment uses thick substrates. For example, in the embodiment of FIG. 1, it is possible to bond the arrays to the prisms, but for large production runs, a monolithic approach is preferred. In either instance, master elements are fabricated, and replicas made from them.

For the microlens arrays, the master tooling may be patterned using an x-y laser pattern generator (LPG), which exposes photoresist-coated substrates in a point-by-point process to a focused sub-micron spot HeCd laser beam ($\lambda$=0.4416 $\mu$m). The exposure dosage is varied on a point-by-point basis and the photoresist is processed for low contrast such that the relief profile after aqueous development is continuous. This manufacturing process allows for smooth, deep-sag microlenses to be achieved, while simultaneously having the ability to pattern diffractive or alignment features that require sharp profiles. The gradient focal length of the microlens array can be achieved by loading the control software of the LPG with the appropriate bitmap that defines the shape of each microlens in the array. The sag of the microlenses is anticipated to be in the 13 to 15 $\mu$m range. Once the photoresist is patterned, a rigid master for replication can be made by etch-transferring (through the use of a reactive ion etcher) the resist profile into the underlying substrate, or by electroplating.

The minilens array can be initially fabricated through the use of single-point diamond turning (SPDT). Due to the 5-mm clear aperture and focal length on the order of 20 mm, the sag of the minilens is estimated to be 310 $\mu$m, a depth which is generally too large for the LPG process. Since there are typically a small number of lenses in the minilens array (say 4 to 10), it appears feasible to use a precision mechanical fixture that will enable the SPDT machine to turn each minilens separately. The center-to-center registration of each minilens is anticipated to be better than 10 $\mu$m. The diamond-turning manufacturing technique allows a metal plug to be fabricated directly, and then subsequently used as a master for replication.

During the initial phase of the manufacturing effort, a cast-and-cure process can be used to produce replicated interconnect elements. In the cast-and-cure method, a thin polymer layer is added to a glass or bulk plastic substrate through the use of a suitable master and release agents. The polymer layer can be made such that its thickness is only 1–2 $\mu$m thicker than the total sag of the microstructure being replicated. Injection molding is preferred for larger production runs of these interconnection elements. Injection molding allows for very high volumes of these optical interconnects to be produced at low cost, but inevitably presents manufacturing and environmental issues such as polymer shrinkage, thermal coefficients of expansion, and glass transition temperatures. Dealing with these issues is generally within the skill of the art.

It is also desired to implement similar features onto thick substrates. The mastering techniques used for the thick-substrate interconnects are typically identical to those of the thin-substrate interconnects: SPDT can be used for the minilens arrays, the LPG process can be used for the microlens arrays, and the replication process used initially can be the cast-and-cure process. In the cast-and-cure process, the microlens array pattern is replicated on one side of a glass block or prism, and the minilens array pattern is replicated another side of the block or prism. The array-to-array alignment tolerance is likely to be as much as ±25 $\mu$m, which can be achieved mechanically. Tighter tolerances could require optical alignment techniques.

Injection molding of the thick-substrate interconnects, where thicknesses are on the order of 30 mm sides, presents greater manufacturing challenges. Injection mold inserts can be fabricated for both sides of the cavity, but the primary issue is likely to be the amount of shrinkage or sink that the part will experience after being molded. The gate and vent geometries of the cavity can be tailored to minimize the sink effect, but most likely the effect cannot be eliminated. Reducing cycle times such that the material is allowed to cool at a slower rate will help. One approach is to fabricate mold inserts that precompensate for the thermal shrinkage, which implies putting microlenses onto curved surfaces. This is a possibility for the diamond-turned minilens array insert, as well as for the microlens element, through the use of a conformal LPG.

Graded Focus Microlens Array

Figure 10:
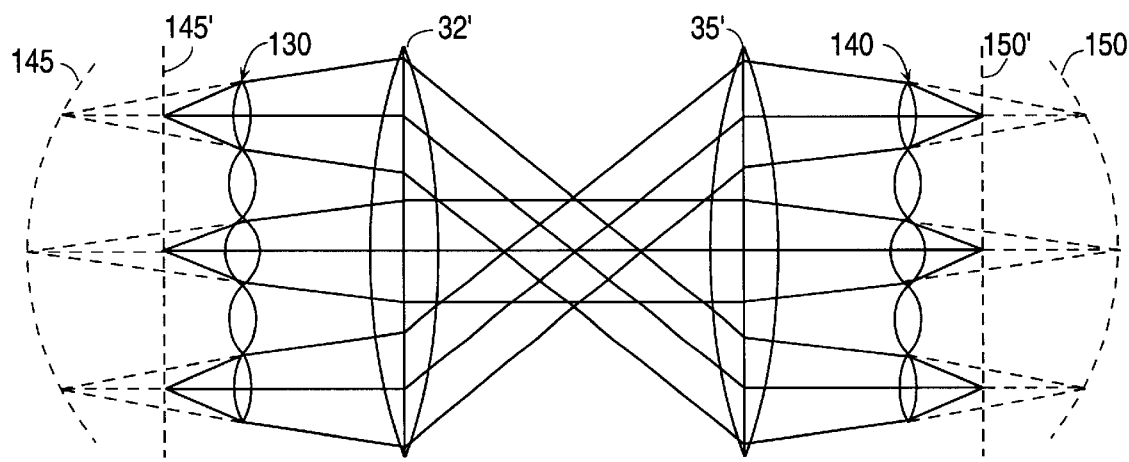
FIG. 10 shows schematically how the use of spatially varying microlens arrays corrects for field (Petzval) curvature of one of the minilenses.

FIG. 10 shows schematically how the use of spatially varying microlens arrays corrects for field (Petzval) curvature of the minilenses. As alluded to above, in some implementations it is desired to configure the microlens array so as to compensate for field curvature of the minilenses. This is accomplished by having the focal length of the microlenses vary with spatial position to correct field curvature.

The figure shows two minilenses 32' and 35', which correspond to single elements of minilens arrays 32 and 35 in other figures, while the microlens clusters that are associated with the minilenses are denoted 130 and 140. In the absence of the microlens arrays, light emitted from points in a curved object plane 145 is imaged at respective points in a curved image plane 150. The dashed ray lines, plus the solid ray lines between microlens clusters 130 and 140 represent the relay characteristics of two minilenses.

Correction of field curvature in single-element lenses is generally difficult. However, by making the focal lengths of the microlenses at the center of the array shorter than those towards the outside of the array, it is possible to correct for the field curvature of the minilenses. This is shown schematically in the drawing as thicker microlenses closer to the minilens axis. In general, the effect of the microlens arrays is to bring the object and image planes closer. However, if the microlenses were not configured with spatially varying focal lengths, the object and image planes would still be curved. As shown schematically, the microlenses are configured with spatially varying focal lengths to result in a flat object plane 145' and a flat image plane 150'.

Figure 11:
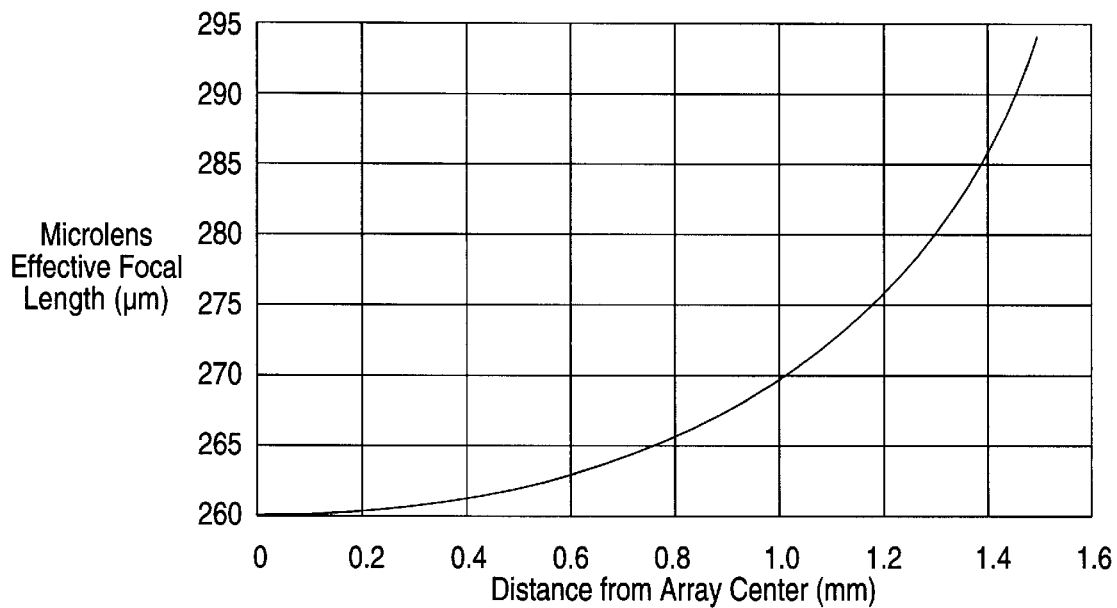
FIG. 11 shows a graph of microlens focal length as a function of distance from the center of the microlens cluster used to correct field curvature of the minilens relay.

FIG. 11 shows a graph of microlens focal length as a function of distance from the center of the cluster used to correct Petzval curvature of the minilens relay. We modeled the effects of the Petzval curvature of a 20-mm effective focal length minilens relay, used with a 0.178 numerical aperture input and output beam to evaluate the range of microlens focal lengths required across the microlens array.

As can be seen, the focal length ranges from 260 $\mu$m at the center element to 290 $\mu$m for elements 1.4 mm off axis. The graph clearly shows a rapid increase for field positions greater than 1.4 mm, consistent with the fact that the spherical Petzval field curves towards infinity (in the longitudinal direction) at distances from the axis corresponding to the radius of curvature of the field itself. Thus the available array size is still limited by the Petzval curvature of the minilenses but is significantly increased when using the microlens array with the spatially varying focal length.

Figure 12:
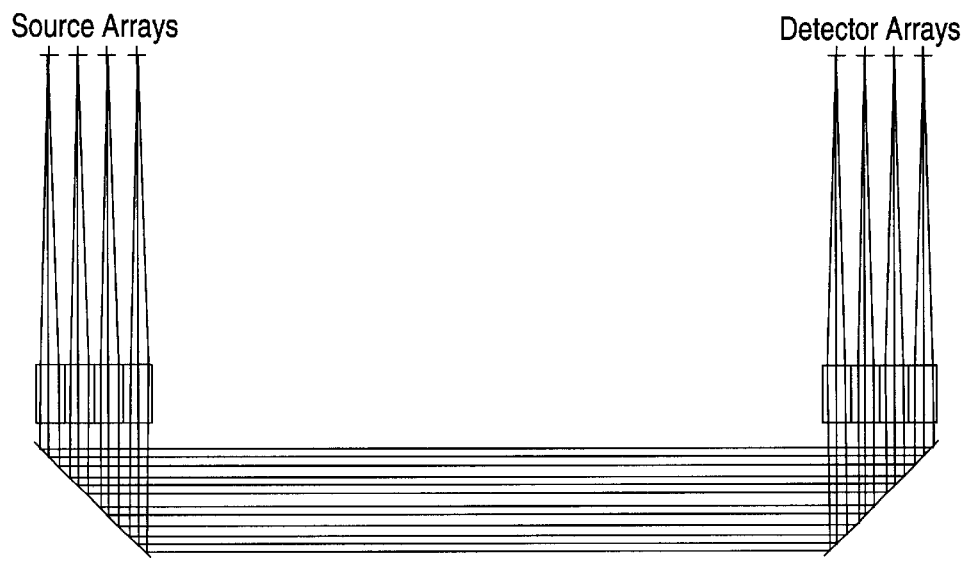
FIG. 12 shows a ray trace developed in modeling an embodiment of the invention.

FIG. 12 shows a ray trace modeled using Oslo optical design software for the central microlens of each of four clusters corresponding to each of four minilenses. The microlenses were set to the same focal length. This relays the optical data from the sources at the upper left to the receivers at the upper right. We modeled and ray traced different optical systems for different board spacings and parameters of the optoelectronic arrays. This particular design has a 19.0-mm effective focal length and a 5-mm aperture for the minilenses, and a 260-$\mu$m effective focal length and 125-$\mu$m aperture for the microlenses. This means that the minilens and microlens are used at f/12.6 and f/6.25 with beam diameters of 1.5 mm and 40 $\mu$m, respectively.

This system, in combination with the graded focus microlens arrays, is capable of providing an interconnect density of 1600 interconnects/cm2, with a total optical I/O of 3200 per module, interconnecting boards spaced at a distance of 8 cm. The microlenses are preferably in a square packing geometry, but the clear aperture of the entire array will be hexagonal (see rightmost portion of FIG. 2) in order to maximize optical throughput of the system and to match the transmitter and receiver array configurations. Use of the spatially varying microlens to correct field curvature makes it possible to obtain a high interconnect density of 1600/cm2 and to provide an optical system with large enough capacity per minilens channel to accommodate 400-element patches.

Conclusion

In conclusion, it can be seen that the present invention provides a flexible and capable optical interconnection system. The configuration using microlenses and minilenses avoids the need for a costly and difficult lens with a short focal length and large diameter (large numerical aperture or small f/number). Because of the small sizes of the microlenses and the ability to add clusters of elements, this system is also extensible for larger numbers of channels. Clusters of elements ranging in number from a few to hundreds are possible using this approach. Combining clusters means that interconnects of thousands can be achieved.

While the above is a complete description of specific embodiments of the invention, various modifications, alternative constructions, and equivalents may be used. For example, the invention could also be used with other sources and receivers that are not vertical emitting lasers. Other possible sources potentially include stacked bars of linear laser arrays, and arrays of terminated fiber optic elements. Receivers could be arrays of terminated fibers. These combinations then lead to applications such as fiber to bulkhead for both transmitters and receivers, as well as fiber to fiber. This implementation has advantages for large arrays in that the looser alignment tolerances obtained by using the microlens/minilens make it easier to align large fiber connectors.

The free space interconnect of the invention can be used to direct the outputs to more than two locations. This would be advantageous if architectures other than linear interconnections are to be used. For example, a chip could be connected to its four nearest neighbors. Furthermore, while the modules in some embodiments are shown using prisms to fold the optical path, other reflecting elements such as mirrors can be used. Indeed, the embodiment of FIG. 8 uses mirrors on the backplane for folding the optical path.

Another embodiment of this architecture would use a backplane that had additional optics. For example, relay lenses in a manner similar to McGill OC '98 could be used to increase the distances between modules. (Yongsheng Liu et al., "Design, implementation, and characterization of a hybrid optical interconnect for a four-stage free-space optical backplane demonstrator," *Applied Optics*, Vol. 37, No. 14, 10 May 1998, Optical Society of America.)

Therefore, the above description should not be taken as limiting the scope of the invention as defined by the claims.

What is claimed is:

1. An optical system for imaging an array of light sources, the sources being characterized by respective divergence angles, the optical system comprising:

an array of microlenses disposed to intercept light from respective light sources in the array of light sources to reduce the divergence angles of light emanating from the light sources; and an imaging system disposed to intercept light from said array of microlenses, said imaging system having first and second arrays of lenses, each lens in said first array being sized to intercept light from a respective sub-plurality of the microlenses, each lens in said second array intercepting and focusing light from a respective lens in the first array so that the light from each source in the array is focused on a respective unique location.

2. The optical system of claim 1, wherein said imaging system is doubly-telecentric with unit magnification.

3. The optical system of claim 1, wherein said imaging system is doubly-telecentric with a magnification other than unity.

4. The optical system of claim 1, and further comprising an additional array of microlenses disposed to intercept light from said second array of lenses in said imaging system, each microlens in said additional array of microlenses intercepting and focusing light that originated from a respective light source in the array of light sources and passed through a respective microlens in said first-mentioned array of microlenses.

5. The optical system of claim 1, and further comprising an array of detectors optically conjugate with the array of light sources.

6. The optical system of claim 5, wherein:

said detectors are generally commensurate in size with said microlenses; and light from said second array of lenses is focused on said detectors without intervening lenses.

7. The optical system of claim 5, wherein:

said detectors are significantly smaller than said microlenses;

the optical system includes an additional array of microlenses disposed between said second array of lenses and said array of detectors; and light from said second array of lenses is further focused by said additional array of microlenses before impinging on said array of detectors.

8. The optical system of claim 1, wherein:

the array of sources and said array of microlenses are arranged as a plurality of separated clusters according to a predefined pattern; and said first array of lenses are arranged according to said predefined pattern with each lens in said first array having a lateral extent greater than the lateral extent of a respective one of said clusters.

9. The optical system of claim 1, wherein:

the array of sources, said array of microlenses, and a first portion of said imaging system are disposed on a first module;

a second portion of said imaging system and an array of detectors are disposed on a second module that is separable from said first module; and said first and second modules are engaged with a backplane structure that registers the modules.

10. The optical system of claim 9, wherein:

the array of sources, said array of microlenses, and said array of detectors are disposed in first, second, and third parallel planes;

said first and second portions of said imaging system are disposed in a fourth plane that is perpendicular to said first plane; and said modules include reflecting elements to fold the optical path between the array of sources and the array of detectors.

11. The optical system of claim 9, wherein:

the array of sources, said array of microlenses, said array of detectors, and said first and second portions of said imaging system are disposed in parallel planes; and said backplane structure include reflecting elements to fold the optical path between the array of sources and the array of detectors.

12. A method of imaging an array of light sources, the sources being characterized by a divergence angle, the method comprising:

reducing the divergence angle of light emanating from each of the light sources to provide a corresponding set of less-divergent beams; and for each of a plurality of subsets of beams, using respective first and second lenses to relay and focus that subset of beams so that each beam in each of said plurality of subsets of beams is focused on a respective unique location.

13. The method of claim 12, wherein the divergence angle of light emanating from each of the light sources is reduced by a respective microlens in a microlens array.

14. The method of claim 12, and further comprising increasing the convergence angle of each beam emanating from the second lenses.

15. The method of claim 14, wherein the convergence angle of each beam emanating from the second lenses is increased by a respective microlens in a microlens array.

16. A method of imaging an array of light sources onto an array of points, the sources being characterized by a divergence angle, the method comprising:

reducing the divergence angle of light emanating from each of the light sources to provide a corresponding set of less-divergent beams;

for each of a plurality of subsets of beams, using respective first and second lenses to relay and focus that subset of beams; and increasing the convergence angle of each beam emanating from the second lenses.

17. The method of claim 16, wherein the divergence angle of light emanating from each of the light sources is reduced by a respective microlens in a microlens array.

18. The method of claim 16, wherein the convergence angle of each beam emanating from the second lenses is increased by a respective microlens in a microlens array.

19. An optical system for imaging an array of light sources, the sources being characterized by respective divergence angles, the optical system comprising:

a first array of microlenses disposed to intercept light from respective light sources in the array of light sources to reduce the divergence angles of light emanating from the light sources;

an imaging system disposed to intercept light from said first array of microlenses, said imaging system having first and second arrays of lenses, each lens in said first array being sized to intercept light from a respective sub-plurality of the first array of microlenses, each lens in said second array intercepting light from a respective lens in the first array; and a second array of microlenses disposed to intercept light from said second arrant of lenses in said imaging system, each microlens in said second array intercepting and focusing light that originated from a respective light source in the array of light sources and passed through a respective microlens in said first array of microlenses.

20. The optical system of claim 19, wherein said imaging system is doubly-telecentric.

21. The optical system of claim 19, and further comprising an array of detectors optically conjugate with the array of light sources.

22. The optical system of claim 19, wherein said detectors are significantly smaller than said microlenses.

23. An optical system for imaging an array of light sources, the sources being arranged as a plurality of separated clusters according to a predefined pattern and being characterized by respective divergence angles and being, the optical system comprising:
an array of microlenses disposed to intercept light from respective light sources in the array of light sources to reduce the divergence angles of light emanating from the light sources, said array of microlenses being arranged as a plurality of separated clusters according to said predefined pattern; and
an imaging system disposed to intercept light from said array of microlenses, said imaging system having first and second arrays of lenses,
said first array of lenses being arranged according to said predefined pattern with each lens in said first array having a lateral extent greater than the lateral extent of a respective one of said clusters so as to intercept light from a respective sub-plurality of the microlenses,
each lens in said second array intercepting and focusing light from a respective lens in said first array.

24. The optical system of claim 23, wherein said imaging system is doubly-telecentric.

25. The optical system of claim 23, and further comprising an additional array of microlenses disposed to intercept light from said second array of lenses in said imaging system, each microlens intercepting and focusing light that originated from a respective light source in the array of light sources and passed through a respective microlens in said first-mentioned array of microlenses.

26. The optical system of claim 23, and further comprising an array of detectors optically conjugate with the array of light sources.

27. The optical system of claim 26, wherein:
said detectors are generally commensurate in size with said microlenses; and
light from said second array of lenses is focused on said detectors without intervening lenses.

28. The optical system of claim 26, wherein:
said detectors are significantly smaller than said microlenses;
the optical system includes an additional array of microlenses disposed between said second array of lenses and said array of detectors; and
light from said second array of lenses is further focused by said additional array of microlenses before impinging on said array of detectors.

29. An optical system for imaging an array of light sources, the sources being characterized by respective divergence angles, the optical system comprising:
an array of microlenses disposed to intercept light from respective light sources in the array of light sources to reduce the divergence angles of light emanating from the light sources; and
an imaging system disposed to intercept light from said array of microlenses, said imaging system having first and second arrays of lenses, each lens in said first array being sized to intercept light from a respective sub-plurality of the microlenses, each lens in said second array intercepting and focusing light from a respective lens in the first array,
wherein:
the array of sources, said array of microlenses, and a first portion of said imaging system are disposed on a first module;
a second portion of said imaging system is disposed on a second module that is separable from said first module; and
said first and second modules are engaged with a backplane structure that registers the modules.

30. The optical system of claim 29, wherein:
said second module further includes an array of detectors;
the array of sources, said array of microlenses, and said array of detectors are disposed in first, second, and third parallel planes;
said first and second portions of said imaging system are disposed in a fourth plane that is perpendicular to said first plane; and
said modules include reflecting elements to fold the optical path between the array of sources and the array of detectors.

31. The optical system of claim 29, wherein:
the array of sources, said array of microlenses, and said first and second portions of said imaging system are disposed in parallel planes; and
said backplane structure includes reflecting elements to fold the optical path between said first and second portions of said imaging system.

32. The optical system of claim 29, wherein said imaging system is doubly-telecentric.

33. The optical system of claim 29, and further comprising an additional array of microlenses disposed to intercept light from said second array of lenses in said imaging system, each microlens intercepting and focusing light that originated from a respective light source in the array of light sources and passed through a respective microlens in said first-mentioned array of microlenses.

34. The optical system of claim 29, wherein:
said second module further includes an array of detectors that are generally commensurate in size with said microlenses; and
light from said second array of lenses is focused on said detectors without intervening lenses.

35. The optical system of claim 29, wherein:
said second module further includes an array of detectors that are significantly smaller than said microlenses;
the optical system includes an additional array of microlenses disposed between said second array of lenses and said array of detectors; and
light from said second array of lenses is further focused by said additional array of microlenses before impinging on said array of detectors.

36. An optical system for coupling light diverging from a first array of points to a second array of points, the optical system comprising:
an array of microlenses disposed to intercept light from respective points in the first array of points to reduce the divergence angles of the light emanating from the points in the first array; and
an imaging system disposed to intercept light from said array of microlenses, said imaging system having first and second arrays of lenses, each lens in said first array being sized to intercept light from a respective subplurality of the microlenses, each lens in said second array intercepting and focusing light from a respective lens in the first array such that light emanating from a given point in the first array of points is focused toward a corresponding given point in the second array of points.

37. The optical system of claim 36, wherein said imaging system is doubly-telecentric.

38. The optical system of claim 36, wherein:

an array of light sources is disposed at the first array of points; and an array of detectors is disposed at the second array of points.

39. The optical system of claim 36, wherein:

an first array of fiber ends is disposed at the first array of points; and a second array of fiber ends is disposed at the second array of points.

40. The optical system of claim 36, and further comprising an additional array of microlenses disposed to intercept light from said second array of lenses in said imaging system, each microlens intercepting and focusing light that emanated from a respective point in the first array of points and passed through a respective microlens in said first-mentioned array of microlenses.

* * * * *